(12) United States Patent
Cherkasova

(10) Patent No.: US 6,888,836 B1
(45) Date of Patent: May 3, 2005

(54) METHOD FOR ALLOCATING WEB SITES ON A WEB HOSTING CLUSTER

(75) Inventor: Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 510 days.

(21) Appl. No.: 09/318,722

(22) Filed: May 26, 1999

(51) Int. Cl.$^7$ ............................................. H06L 12/28
(52) U.S. Cl. ..................................... 370/400; 709/238
(58) Field of Search ................................ 370/229, 400, 370/401, 402, 352; 709/105, 201, 202, 203, 224, 225, 226, 227, 228; 711/120, 130

(56) References Cited

U.S. PATENT DOCUMENTS

| | | | |
|---|---|---|---|
| 6,070,191 A | * | 5/2000 | Narendran et al. ......... 709/217 |
| 6,098,093 A | * | 8/2000 | Bayeh et al. ............... 709/200 |
| 6,263,368 B1 | * | 7/2001 | Martin ....................... 709/105 |
| 6,351,775 B1 | * | 2/2002 | Yu ............................. 370/237 |

\* cited by examiner

*Primary Examiner*—John Pezzlo
*Assistant Examiner*—David Odland

(57) ABSTRACT

A method for operating a cluster of N server nodes to service client requests received on a network. Each client request is directed to one of C customers hosted on the server cluster. Each customer is identified by a domain name, and each server node is identified by an address on a network. In the method of the present invention, the customers are grouped into N groups, each group being assigned to a corresponding one of the server nodes. Configuration information is provided to a Domain Name Server (DNS), the information defining the correspondence between each of the customers and one of the server nodes assigned to one of the groups containing that customer. The DNS provides the address of the server node in response to a message specifying the domain name of the customer. The client then directs its request to the identified server node utilizing the address provided by the DNS. In the preferred embodiment of the present invention, the grouping of the customers depends on a measurement of the computational resources required to service the client requests for each of the customers. In embodiments in which the activity associated with each request is primarily the return of files stored in the cluster, the measurement of computational resources includes the size of the files returned by each client—within a time period and the communication bandwidth needed to service the requests.

8 Claims, 1 Drawing Sheet

METHOD FOR ALLOCATING WEB SITES ON A WEB HOSTING CLUSTER

FIELD OF THE INVENTION

The present invention relates to computer networks, and more particularly, to a method for distributing tree-structured file groups such as those used in Web sites among a plurality of servers.

BACKGROUND OF THE INVENTION

To simplify the following discussion, the present invention will be discussed in terms of Web Sites on the Internet. Web content hosting is an increasingly common practice on the Internet. In Web content hosting, a provider who has sufficient resources to host multiple web sites offers to store and provide Web access to documents for clients of institutions, companies and individuals who lack the resources, or the expertise to efficiently maintain a Web server with the necessary security, availability, and peak bandwidth to the Internet.

Typically, the provider utilizes a cluster of servers to increase the capacity and computing power available for servicing the hosted sites. The goal of the cluster design is to distribute the computing load across the servers in the cluster. The simplest form of distribution is to assign each new file request to a server using a "round robin" algorithm. This type of system basically guarantees that each server is equally likely to receive a request on average. Systems in which the next request is sent to the server having the lightest computational load have also been proposed. Ideally, a cluster of N web servers should be N times more powerful than one web server. Unfortunately, prior art clusters do not provide such ideal performance.

Web server performance greatly depends on efficient RAM usage. A web server typically provides files that are stored on disks. To increase the efficiency of the server, a disk cache is created in RAM. If the requested file is already in the disk cache, it can be provided quickly. If a cache miss occurs, the response time is degraded by more than a factor of 10.

Unfortunately, load balancing for a cluster of web servers interferes with efficient RAM usage for the cluster. If new file requests are distributed equally across the servers, the popular files tend to occupy RAM space in all the server nodes. This redundant replication of "hot" content throughout the RAM of all the nodes leaves much less available RAM space for the rest of the content. As a result, cache misses become common for the remaining content and overall system performance is degraded.

To prevent unnecessary duplication of the hot content, some load balancing systems keep track of the server that last serviced a request for a particular file and route the request to that server provided its current workload is not too high. If the server is already overloaded, the load balancing system routes the request to another server that has a lower workload. Unfortunately, these systems depend on expensive special purpose hardware switches through which all of the traffic must pass. In addition to increasing the costs of the server clusters, these switches introduce a single point of failure that can bring down the entire server cluster.

Another approach to load balancing in a cluster, is to statically partition and assign the customers to the servers. For example, 100 customers could be partitioned as 10 customers per server in the configuration of 10 web servers. However, any such static partition can not take into account changing traffic patterns as well as the nature of changes in the content of the sites. As a result, such systems cannot adjust the partition to accommodate changing traffic and site dynamics.

Broadly, it is the object of the present invention to provide an improved load balancing system.

It is a further object of the present invention to provide a load balancing system that does not rely on hardware switches.

It is a still further object of the present invention to provide a load balancing system that can accommodate changing traffic patterns.

These and other objects of the present invention will become apparent to those skilled in the art from the following detailed description of the invention and the accompanying drawings.

SUMMARY OF THE INVENTION

The present invention is a method for operating a cluster of N server nodes to service client requests received on a network. Each client request is directed to one of C customers hosted on the server cluster. Each customer is identified by a domain name, and each server node is identified by an address on a network. In the method of the present invention, the customers are grouped into N groups, each group being assigned to a corresponding one of the server nodes. Configuration information is provided to a router that is preferably a Domain Name Server (DNS), the information defining the correspondence between each of the customers and one of the server nodes assigned to one of the groups containing that customer. The router provides the address of the server node in response to a message specifying the domain name of the customer. The client then directs its request to the identified server node utilizing the address provided by the router. In the preferred embodiment of the present invention, the grouping of the customers depends on a measurement of the computational resources required to service the client requests for each of the customers. In embodiments in which the activity associated with each request is primarily the return of files stored in the cluster, the measurement of computational resources includes the size of the files returned by each client within a time period. In addition, the measurement of computational resources may also include measuring an average communication bandwidth needed to service the requests for each customer within the time period. The measurement of the computational resources is preferably performed periodically at each of the server nodes and the configuration information used by the DNS is updated as a result of the periodic measurements determining a better partition for the customers among the server nodes.

DETAILED DESCRIPTION OF THE INVENTION

Figure 1:
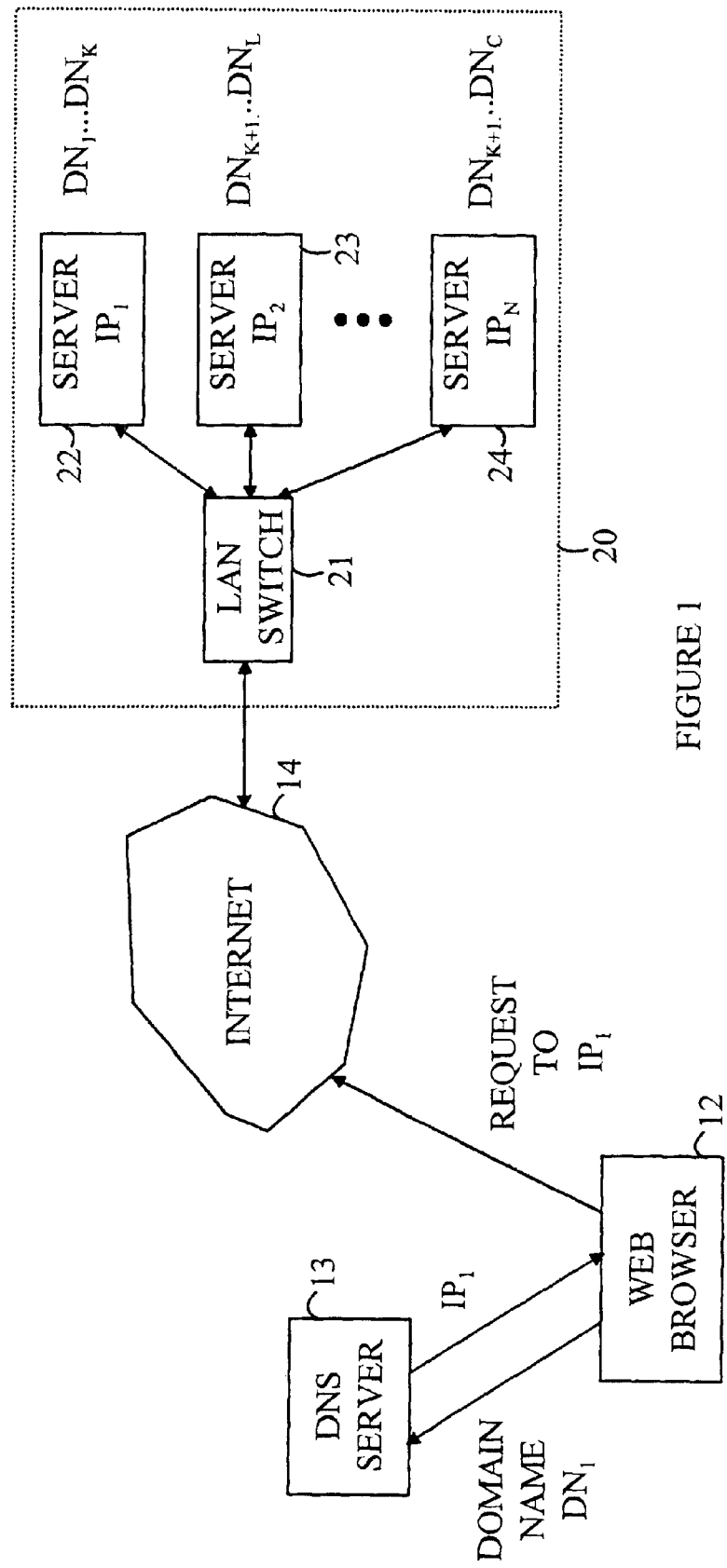
FIG. 1 is a block diagram illustrating the manner in which one embodiment of the sent invention operates.

Consider a cluster of N web servers that is to be used to host C customers. By monitoring the access patterns and access rates associated with each customer's content, the overall content is logically partitioned in a number of "equally balanced" groups, each group being serviced by a corresponding server node.

It is assumed that each customer has a corresponding domain name. Refer now to FIG. 1 which is a block diagram illustrating the manner in which one embodiment of the resent invention operates. A client 12 of the customer having domain name $DN_1$ wishing to download information from $DN_1$ obtains the IP address of the server responsible for $DN_1$ from a domain name server (DNS) as shown at 13. The DNS may be accessed via the Internet or may be part of the local area network on which client 12 resides. The IP address for the server in question is denoted by $IP_1$ in the following discussion. Client 12 then addresses its request to $IP_1$ over the internet 14. The server having IP address $IP_1$ is part of a cluster of servers shown at 20. A local area network switch 21 directs the request to the server having IP address $IP_1$, which is shown at 22. This server serves customers having domain names $DN_1 \ldots DN_K$ in the example shown in FIG. 1. Other representative servers in cluster 20 are shown at 23 and 24 together with the domain names assigned to each server.

The present invention operates by providing the correspondence between each customer domain name and a server IP address to the DNS server via configuration files. The correspondence can be updated on a daily, weekly or even hourly basis. To provide the data needed for optimizing the assignments, each server in the cluster measures the traffic for each customer assigned to it. The data is analyzed to determine the optimum assignment of customers to servers. The data from all the servers can be analyzed by one of the servers, by a "control node" in the server cluster, or by a computer outside of the server cluster. When the analysis of the traffic patterns finds a new, better partitioning of the customers for the server cluster, then new DNS configuration files are generated and transmitted to the relevant DNS servers. The configuration files are sent to the primary DNS that is responsible for the zone in which the cluster is located. The primary DNS will then provide the relevant data to other DNSs on the internet. Once a DNS server has updated its configuration tables, new requests are routed accordingly to the new configuration files, which leads to more efficient traffic balancing on the server cluster.

Having provided this overview, the manner in which a partitioning of the customers among the server's generated will now be explained for one embodiment of the present invention. For each customer c, a "customer profile" $CP_c$ is built. A customer profile $CP_c$ consists of two following basic characteristics in this embodiment of the present invention:

$AR_c$—the access rate, or communication bandwidth, required to deliver a customer's content, i.e. bytes/sec of information returned to the requesting clients on the network.

$WS_c$—the total size of the most often requested files, hereinafter referred to as the "working set". Typically, a profile is built over a predetermined time period such as the previous 24 hrs. A file is added to the working set if it is requested during this period. However, other methods for defining the working set may be utilized. For example, the frequency with which each file is requested can also be recorded. The files are then ordered by frequency of request. The working set can then be limited to the files that are requested more than a predetermined of times or the set of files that requires a specified amount of memory.

The customers are then partitioned in N "equally balanced" groups: $C_1, \ldots, C_N$ in such a way, that cumulative access rates and cumulative "working sets" in each of those $C_i$ groups are approximately the same.

In explaining this embodiment of the present invention, the following notation will be utilized:

NumCustomers—a number of customers hosted on a server cluster.

NumServers—a number of nodes (servers) in a server cluster.

CustomerWS[i]—an array which stores the total size of the most frequently requested files of the i-th customer content, referred to as "the working set" for the $i^{th}$ customer.

CustomerRate[i]—an array which stores the communication bandwidths required to service the $i^{th}$ customer.

Without a loss of generality, it is assumed that the customers are ordered by the working set, i.e. the array CustomerWS[i] is ordered.

The goal of the balancing algorithm is to assign the customers to the servers in such a way that balances the size of the working set and the access rates for each server. Such an assignment will be referred to as a "partition".

First, the algorithm computes the ideal balance, the average working set space needed per server, referred to as "Even" in the following discussion, i.e., $$WorkingSetTotal = \sum_{i=1}^{NumCustomers} CustomerWS[i]$$

$$Even = \frac{WorkingSetTotal}{NumServers}$$

Second, the algorithm normalizes the access rates, i.e., $$RatesTotal = \sum_{i=1}^{NumCustomers} CustomerRate[i]$$

$$CustomerRate[i] = \frac{100\% * NumServers * CustomerRate[i]}{RatesTotal}$$

The goal of the algorithm can be restated in terms of these quantities as follows. The algorithm seeks to partition all the customers into NumServers "equally balanced" groups $C_1, \ldots, C_N$ in such a way, that cumulative "working sets" in $C_i$ are close to Even and cumulative access rates $C_i$ are approximately 100%.

The pseudo-code for an algorithm for accomplishing this balancing is shown below. This pseudo-code uses the following additional notations:

CustomersLeftList—the ordered list of customers which are not yet assigned to the servers. In the beginning, the CustomersLeftList is the same as the original ordered list of customers CustomerList;

ServerAssignedCustomer[i]—the list of customers which are assigned to the i-th server;

Server WS[i]—the cumulative "working set" of the customers currently assigned to the i-th server:

ServerRate[i]—the cumulative "access rate" of the customers currently assigned to the i-the server.

abs-dif(x,y)—the absolute difference between x and y, i.e. (x-y) or (y-x), whatever is positive.

The assignment of the customers to all of the servers except the last one is done according to the pseudo-code shown below. The code is applied in a cycle to the first NumServers-1 servers. All the customers that are left in CustomersLeftList are assigned to the last server.

```
/*
we assign customers to the i-th server from the CustomersLeftList
using random function until the addition of the chosen customer
content does not exceed the ideal content limit per server Even.
*/
customer = random(CustomersLeftList);
if (ServerWS[i] + CustomerWS[customer] <= Even) {
append(ServerAssignedCustomers[i], customer);
remove(CustomersLeftList, customer);
ServerWS[i] = ServerWS[i] + CustomerWS[customer];
ServerRate[i] = ServerRate[i] + CustomerRate[customer];
}
else {
/*
if the addition of the chosen customer content exceeds
the ideal content limit per server Even
we try to find such a last_customer from the CustomersLeftList
which results in a minimum deviation from the SpaceLeft
on this server
*/
SpaceLeft = Even - ServerWS[i]
find last_customer with min (abs_dif(SpaceLeft -
CustomersWS[last_customer]));
append(ServerAssignedCustomers[i] , last_customer);
remove(CustomersLeftList, last_customer);
ServerWS[i] = ServerWS[i] + CustomersWS[last_customer];
ServerRate[i] = ServerRate[i] + Customers/rate[last_customer];
}
if (ServerWS[i] > Even {
/* small optimization at the end" returning the customers with smallest
working sets back to the CustomersLeftList until the deviation
between the server working set ServerWS[i] and the ideal content
per server Even is minimal.
*/
if (abs_dif(Even - (ServerWS[i] -
CustomersWS[redundant_customer])) <
abs_dif(Even - (ServerWS[i])) {
append)CustomersLeftList, redundant_customer);
remove(ServerAssignedCustomers[i] , redundant_customer);
ServerWS[i] = ServerWS[i] + CustomersWS[redundant_customer];
ServerRate[i] = ServerRate[i] + CustomersRate[redundant_customer];
}
```

This completes one iteration of the algorithm, resulting in the assignment of all the customers to the servers in balanced groups. Typically, this algorithm generates a very good balancing with respect to the cumulative "working sets" of the customers assigned to the servers.

The second goal is to balance the cumulative access rates per server. For each partition, P, generated by the algorithm, the rate deviation of P is defined to be:

$$RateDeviation(P) = \sum_{i=1}^{NumServers} abs\_dif(100, ServerRate[i])$$

Partition $P_1$ is said to be better rate-balanced than partition $P_2$ if $RateDeviation(P_1) < RateDeviation(P_2)$.

The pseudo code shown above generates one such partition on each iteration. The number of iterations is prescribed by the input parameter Times. On each iteration, the algorithm keeps a generated partition only if it is better rate-balanced than the previously best found partition. Typically, the algorithm generates a very good balancing partition with respect to both cumulative "working sets" and cumulative access rates of the customers assigned to the servers in 10,000–100,000 iterations.

The above-described algorithm assigns each customer to one server. However, assignments in which a particular domain name is serviced by two or more servers may also be constructed. Such arrangements are useful for customers that require a high degree of availability. For example, the algorithm can prescribe a minimum of 2 or more server nodes per customer to increase the site availability in case a server fails. Multiple server arrangements are also useful for customers whose traffic typically comes in bursts.

This type of system is actually easier to balance since the rate per customer on any given server decreases corresponding to the number of prescribed servers. Hence, the algorithm has more freedom in assigning customers to servers, since each customer requires only a fraction of the server capacity.

The above-described embodiments of the present invention utilize specific measurements of the computational resources needed to service each customer, i.e., data rates required to service each customer in determining the optimal partition and the size of the working data set for each customer. The first quantity is a proxy for the CPU workload imposed by the customer, and the second is a proxy for the memory space needed to cache data files used by the customer in servicing requests.

In systems in which each customer site is basically a file system that returns files with little additional computation, the data rates are a good proxy for the CPU resources required by the customer, since the main CPU resources utilized are the communication channels. However, other measures of server CPU utilization may be utilized. For example, consider a customer site that performs query searches on a large database stored at the site and then returns the results to the client. The execution of the query may require a significant fraction of the servers computational capacity while returning only a small number of bytes per second to the client initiating the query. The algorithm described above can easily be modified to utilize the average CPU cycles per second needed by each customer in place of the communication bandwidth required by the customer, i.e., the customer rate described above.

The above-described embodiments of the present invention have utilized a DNS as the means for routing a request directed to a domain name to the server on which the customer having that name is serviced. However, it will be obvious to those skilled in the art from the preceding discussion that the load balancing algorithm of the present invention may be practiced with any load balancing scheme. Each load balancer has a routing node that maps a domain name to which a request is directed to a server that is to service the request. The method of the present invention can be used to partition the set of domain names serviced by any cluster to balance the load. The routing node may be a software program running on one of the servers or a hardware router. Accordingly, the term "router" shall be used herein to denote any device that performs the routing function whereby a request directed to a domain name is directed to a server addressed by an address on a cluster of servers.

Various modifications to the present invention will become apparent to those skilled in the art from the foregoing description and accompanying drawings. Accordingly, the present invention is to be limited solely by the scope of the following claims.

What is claimed is:

1. A method for operating a Server cluster comprising N server nodes to service client requests, each client request being directed to one of a plurality of customers hosted on said server cluster, each customer being identified by a domain name and each server node being identified by an address on a network connecting said clients to said server nodes, said method comprising the steps of:

grouping said customers into N groups, each group being assigned to a corresponding one of said server nodes;

providing configuration information to a router accessible from said network, said information defining a correspondence between each of said customers and one of said server nodes assigned to one of said groups containing that customer, said router providing said address of said server node in response to a message specifying said domain name of said customer, wherein said grouping of said customers depends on a measurement of the computational resources required to service said requests to each of said customers.

2. The method of claim 1 wherein said router is a Domain Name Server (DNS).

3. A method for operating a server cluster comprising N server nodes to service client requests, each client request being directed to one of plurality of customers hosted on said server cluster, each customer being identified by a domain name and each server node being identified by an address on a network connecting said clients to said server nodes, said method comprising the steps of:

grouping said customers into N groups, each group being assigned to a corresponding one of said server nodes;

providing configuration information to a router accessible said network, said information defining a correspondence between each of said customers and one of said server nodes assigned to one of said groups containing that customer, said router providing said address of said server node in response to a message specifying said domain name of said customer, wherein said grouping of said customers depends on a measurement of the computational resources required to service said requests to each of said customers, wherein said customers return files in response to said requests, and wherein said measurement of said computational resources comprises the size of the files returned by each client within a time period.

4. The method of claim 3 wherein said measurement of said computational resources further comprises measuring an average communication bandwidth needed to service said requests for each customer within said time period.

5. The method of claim 1 wherein said measurement of said computational resources comprises an average number of CPU cycles per unit time required by said server node to service said requests for each customer.

6. A method for operating a server cluster comprising N server nodes to service client requests, each client request being directed to one of a plurality of customers hosted on said server cluster, each customer being identified by a domain name and each server node being identified by an address on a network connecting said clients to said server nodes, said method comprising the steps of:

grouping said customers into N groups, each group being assigned to a corresponding one of said server nodes;

providing configuration information to a router accessible from said network, said information defining a correspondence between each of said customers and one of said server nodes assigned to one of said groups containing that customer, said router providing said address of said server node in response to a message specifying said domain name of said customer, wherein one of said customers belongs to two of said groups.

7. The method of claim 6 wherein said router selects which of said service nodes corresponding to said two groups will service a request for that customer.

8. The method of claim 1 wherein said measurement of said computational resources is performed periodically at each of said server nodes and wherein said configuration information is updated as a result of at least one of said periodic measurements.

* * * * *